INVENTOR.
DANIEL MURPHY.
BY Christy, Parmelee and Strickland
ATTORNEYS.

Sept. 2, 1958 D. MURPHY 2,849,959
UNITARY ELECTRIC MOTOR AND UNIT DRIVEN THEREBY
Filed April 10, 1956 2 Sheets-Sheet 2

INVENTOR.
DANIEL MURPHY.
BY
ATTORNEYS.

United States Patent Office 2,849,959
Patented Sept. 2, 1958

2,849,959

UNITARY ELECTRIC MOTOR AND UNIT DRIVEN THEREBY

Daniel Murphy, New Castle, Pa.

Application April 10, 1956, Serial No. 577,317

4 Claims. (Cl. 103—87)

My invention relates to electrically driven pumps, and consists in certain new and useful improvements in structure, whereby a single shaft serves both the electric motor and the pump which it drives.

By virtue of my improvements, and in accordance with the objects of my invention, the cost of a motor-pump unit is substantially reduced; the overall length of a motor-pump unit of given capacity is reduced to a minimum, and the normal use of flexible couplings between the motor shaft and the pump shaft is advantageously avoided. The weight of metal stock required for the common shaft of the motor and pump is much less than the weight of the two shafts heretofore required, and the replacement of worn shafts may be economically accomplished readily and quickly. This feature of ready replacement of the shaft is a thing of great importance in the case of motor-pump units used in the pottery industry to propel "slip," or in other industries where a fluid containing abrasive or attritive materials are pumped.

The invention will be understood upon reference to the accompanying drawings, in which.

Figure 1:
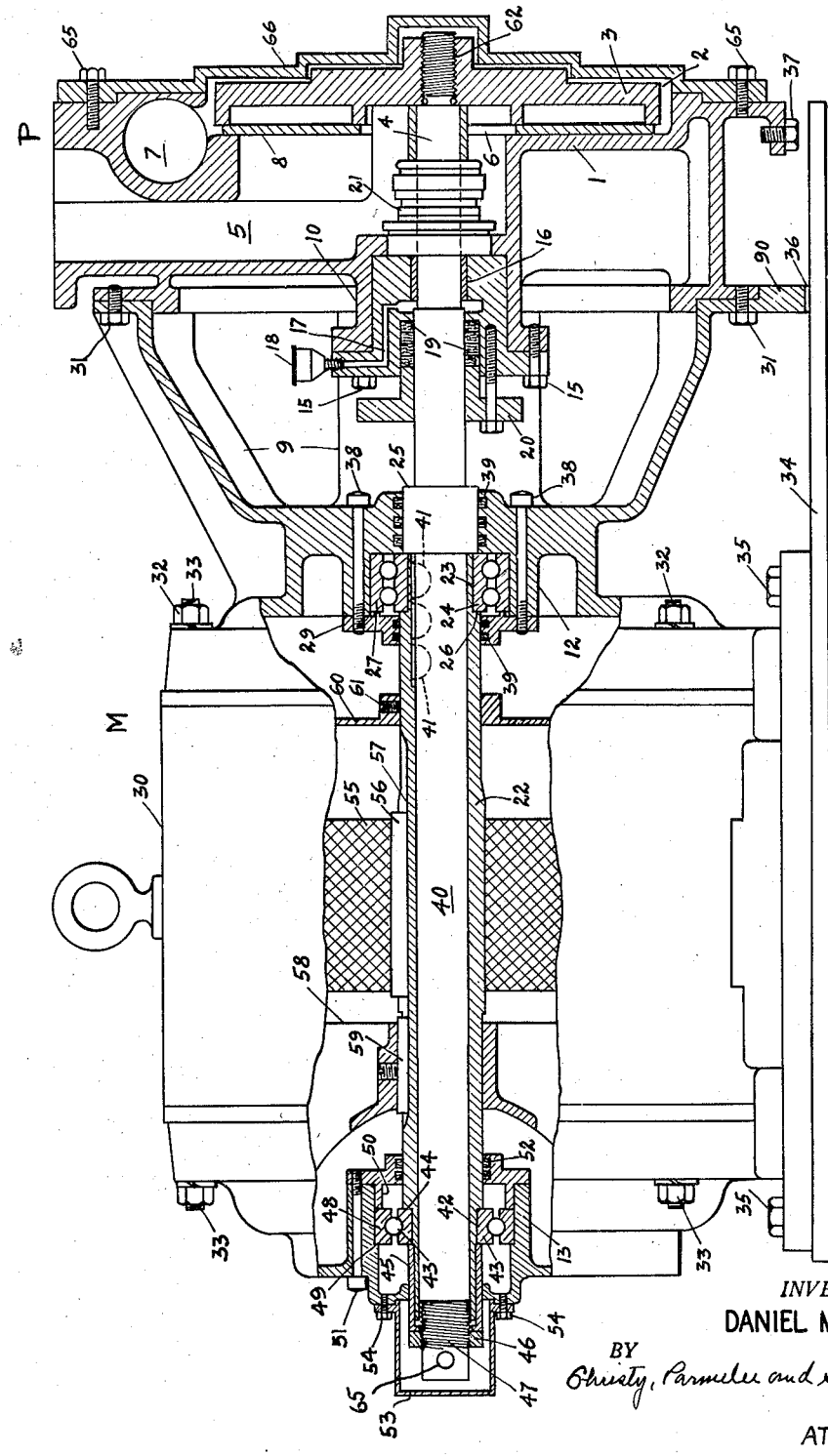
Fig. 1 is a view partly in side elevation and partly in vertical section of a motor-pump unit embodying a structure of my invention.

Referring to Fig. 1 of the drawings, a pump P is arranged to be driven by an electric motor M. The pump may be of conventional form, comprising a body 1, within which is formed the usual impeller chamber 2, and within such chamber a vaned impeller 3 is borne upon a rotary shaft portion 4. Under the influence of the rotating impeller, liquid is drawn into an intake passage 5 and then through the eye 6 of the pump, whence the liquid is delivered at the periphery of chamber 2 to a discharge passage 7. When the pump is in operation, the pressure exerted upon the rotating impeller holds the impeller in abutment upon the side wall on the left (as seen in Fig. 1) of the pump chamber 2. This side wall is advantageously formed as a removable and replaceable wearing plate 8.

Figure 3:
Fig. 3 is a view of the shaft in side elevation.
Figure 2:
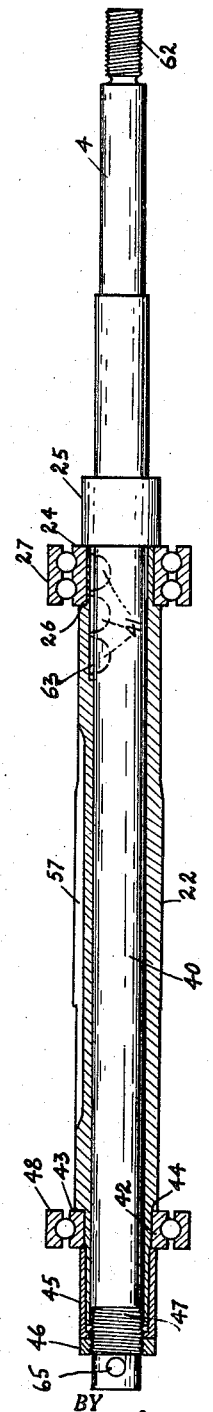
Fig. 2 is a view in side elevation and to larger scale of the common or unitary shaft of the motor-pump unit with a certain sleeve and two of the bearings used with the shaft, the sleeve and bearings being shown in vertical section.

Between the body 1 of the pump and the housing 30 of the motor is a heavy yoke 9. The shaft portion 4 in the usual pump structure extends beyond the yoke 9 and is coupled to, or otherwise brought into power-transmitting connection with, the drive shaft of an electric motor, such as the motor M. That is to say, in the horizontally arranged motor-pump units hitherto on the market the motor and pump have been constructed as two entities, for mounting upon a common bed or base-plate, with the shaft of the motor united to the shaft of the pump in a flexible coupling. In accordance with my present invention the housing 30 of the motor M and the body 1 of the pump P are rigidly integrated and in effect made one, by means of the yoke 9, whereby the shafts of the motor and pump may consist in a single member; that is, the shaft portion 4 of the pump may be formed integrally with the shaft portion 40 of the motor, as shown in Figs. 1, 2 and 3. The yoke 9 is rigidly united with the pump body by screws 31, and is similarly united with the housing 30 of the motor by nuts 32 on through-bolts 33. Thus, while providing for the ready separation of the pump P from the yoke 9 and the motor housing 30, as by removal of screws 31 and nuts 32, the motor and pump form a single structural entity served by a single shaft 4, 40.

The integrated motor and pump unit may conveniently be mounted on a single bed-plate 34, in this case the motor being secured by bolts 35 to the bed-plate, and a shim 36 being drifted beneath the lower limb 90 of the yoke 9 to insure axial alignment of the motor and the pump. In further refinement an adjusting screw 37 in the body of the pump may be turned downwardly into contact with the bed-plate, to provide additional security of alignment and rigidity against relative vibration between the motor and the pump in operation.

The usual electric motor is provided with two bearings for its shaft, and likewise the usual rotary pump essentially includes two bearings for its shaft; that is, there is usually a total of four bearings required for the motor and the pump of a horizontal motor-pump unit, as well as a flexible coupling for uniting such shafts. In the structure of my invention, however, the single shaft serving both the motor and the pump requires only three bearings, thus eliminating one bearing and the flexible coupling required in the usual motor-pump units. More particularly, the pump body 1 provides a housing 10 for one bearing, the yoke 9 provides a support 12 for the second bearing, and the housing 30 of the motor provides a support 13 for the third bearing.

The bearing in housing 10 comprises a block 14 secured in place by screws 15. This block carries a bronze or brass bushing 16 in which the shaft finds bearing, and a passage 17 leads from a grease-cup 18, whereby the lubrication of the bearing may be maintained. A series of packing rings 19 is held compressed by a packing gland 20, to prevent the escape of lubricant outwardly from the bearing. Under the effect of the impeller 3, when it is rotating and exerting pumping suction in the intake passage 5 of the pump, the tendency is to draw lubricant inwardly from the bearing and to deliver the lubricant into the discharge outlet 7 of the pump. In order to prevent the latter loss of lubricant a sealing device 21 is provided. The device 21 is fully illustrated and described in Letters Patent No. 2,658,775, granted November 10, 1953, on my application, and it is needless to involve this specification with the structural details of such device.

It is important to note that the bearing in support 12 does not engage the shaft 4, 40. More particularly, a sleeve 22, through which the shaft extends and to which the shaft is keyed, as at 41, is provided with a seat 23 for the inner ring or raceway 24 of a ball-bearing; the shaft is formed with a heavy collar portion 25, between which collar portion and a shoulder 26 formed on sleeve 22 the bearing ring 24 is rigidly held to its seat 23. The outer ring or raceway 27 of the ball-bearing is secured in place in the support 12, by means of a keeper annulus 29 removably secured to the yoke 9 as by screws 38; and a plurality of shaft-encompassing packing rings 39 in the annulus 29 and in the body of the yoke 9 engage the sleeve 22 and the collar 25, respectively, to inhibit the escape of lubricant from the bearing.

The sleeve 22 is provided with a seat 42 for the inner ring or raceway 43 of a ball-bearing within the support 13 formed in the end of the motor housing 30. The ring 43 is locked against a shoulder 44 formed on the sleeve 22, by means of a thrust tube 45 tightened in place by a nut 46 run home on the threaded end 47 of the shaft, the threads in the shaft being left-hand threads. The outer ring or raceway 48 of the ball-bearing is secured against a shoulder 49 in the support 13 by means of a keeper annulus 50 held in place by screws 51. Packing rings 52 in the annulus 50 engage the surface of the sleeve 22 and prevent lubricant leaking from the bearing into the internal rotating parts of the motor, while a cap 53, removably secured by screws 54, encloses the end of the sleeve and shaft assembly.

The rotor 55 of the motor M is affixed to the sleeve 22 by means of a key 56 secured in a keyway 57 in the sleeve. A motor-cooling fan 58 is also keyed, as at 59, to the sleeve, while on the opposite side of the rotor from the fan a baffle disk 60 is secured to the sleeve by a set screw 61.

When the motor is electrically energized the rotor 55 powerfully drives the sleeve 22, together with the fan 58 and the disk 60 secured to the sleeve. Due to the keyed connection 41 between the sleeve 22 and the shaft 4, 40, the shaft rotates in unison with rotor, whereby the pump impeller, secured in right-hand threaded engagement 62 to the shaft, is driven to do its work.

It will be seen that the structure described provides a compact motor-pump unit, in which three bearings only are required for the common shaft of both the motor and the pump, and obviously the use of the usual flexible coupling is avoided. It will also be noted that, by tightening the nut 46 on the threaded end 47 of the shaft, the thrust tube 45 first urges the bearing ring 43 against the shoulder 44 on the sleeve 22, and then the further turning of the nut 46 acts to urge the shaft in right-to-left direction within the sleeve, whereby the collar 25 integral with the shaft is drawn tightly against the inner bearing ring 24 and tightly locks the ring against the shoulder 26 on the sleeve 22. Thus, the shaft, the sleeve, and the two ball-bearing assemblies are effectively locked in exactly the proper relative positions axially of the motor.

Figure 4:
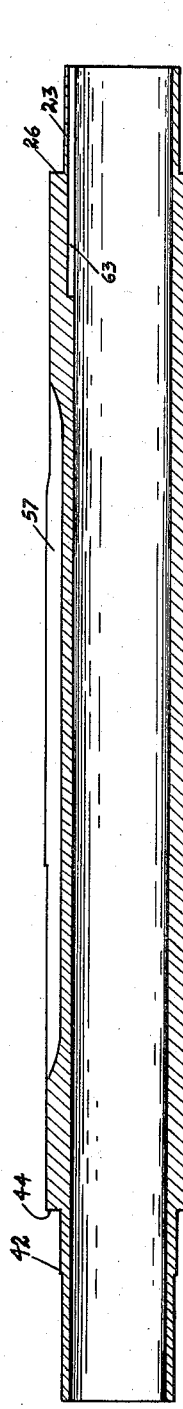
Fig. 4 is a view in vertical section and to still larger scale of the sleeve alone.

If for any reason the shaft should become eroded, or warped or fatigued in service, it is a simple matter to replace it. That is, the cap 53 is removed and the nut 46 unscrewed; then the screws 31 are removed and the pump P is bodily moved to the right, drawing with it the shaft portion 40 from assembled position within the sleeve, it being noted that the keys 41, held in sockets 64 (Fig. 3) in the shaft, engage an open ended keyway 63 (Figs. 2 and 4) in the sleeve 22 that offers no restraint to the withdrawal of the shaft from the sleeve. And it is further noteworthy that the sleeve, engaged at its opposite ends by the ball-bearings that are held in place by the keeper annuli 29 and 50, remains in place and holds all moving parts of the motor in perfect assembly both when the shaft is in assembled position and when it is removed.

It is now a simple matter to remove the shaft portion 4 from assembly with the pump. Specifically, screws 65 (Fig. 1) are withdrawn and a cover plate 66 is removed, thereby giving access to the impeller 3, which is unscrewed from threaded engagement with the right-hand end of the shaft. Next, the packing gland 20 is loosened, and the shaft is withdrawn in right-to-left direction from the sealing device 21 and from the bearing and packing assembled in the housing portion or support 10. The entire shaft is now freed from assembly, and a new shaft may readily be substituted for it simply by reassembling the parts substantially in the reverse order of the take-apart operations described.

It may be noted that a hole 65 is provided in the left-hand end of the shaft. A round bar may be inserted through this hole to secure the shaft against rotation when the nut 46 or the impeller 3 is being tightened on the shaft, or when the nut or impeller is being unscrewed from the shaft.

The improved structure described is of notable value in the pump art, but it will be manifest that the drive shafts of mechanical devices other than pumps may be integrally formed with the shaft of an electric motor embodying my novel sleeve and bearing construction. And it is contemplated that many modifications and variations of the structure described may be made by the artisan within the spirit of the invention defined in the appended claims.

I claim:

1. An electric motor comprising a housing, a rotor in said housing, a rotary sleeve to which said rotor is secured, two bearings supported by said housing, one bearing engaging said sleeve on each of the opposite sides of said rotor, shoulders on said sleeve for securing each of said bearings laterally on one side, a shaft portion telescoped within and removably engaged to said sleeve for rotation therewith, a collar on said shaft portion for laterally engaging one of said bearings on opposite side to secure such bearing against its associate shoulder on said sleeve, means comprising a nut in threaded engagement with said shaft portion for laterally engaging the other of said bearings on opposite side to secure such bearing against its associate shoulder on said sleeve, and a driving shaft portion integral with said shaft portion within said sleeve and extending outwardly from the collar on the shaft portion for engagement to a driven member.

2. A pump unit having a body including a bearing, and an impeller to be powerfully rotated, an electric motor for driving said impeller, said motor having a housing, a yoke for removably uniting said pump body with said motor housing, a rotor in said motor housing, a rotary sleeve to which said rotor is secured, a bearing supported in said yoke and engaged to said sleeve on one side of said rotor, a bearing supported in said motor housing and engaged to said sleeve on the other side of said rotor, shoulders on said sleeve for securing each of said last two bearings laterally on their inner sides, and means including a collar and a threaded nut on said shaft for securing said bearings laterally on their outer sides, whereby said sleeve is borne in substantially fixed axial position for rotation with said rotor, a shaft portion telescoped within and removably engaged to said sleeve for rotation therewith, and a driving shaft portion integral with and extending outwardly from the shaft portion in said sleeve and extending through said yoke and first mentioned bearing into engagement with said impeller.

3. A pump unit having a body including a bearing, and an impeller to be powerfully rotated, an electric motor for driving said impeller, said motor having a housing, a yoke for removably uniting said pump body with said motor housing, a rotor in said motor housing, a rotary sleeve to which said rotor is secured, a bearing supported in said yoke and engaged to said sleeve on one side of said rotor, a bearing supported in said motor housing and engaged to said sleeve on the other side of said rotor, shoulders on said sleeve for securing each of said last two bearings laterally on their inner sides, a shaft portion telescoped within and removably engaged to said sleeve for rotation therewith, a collar on said shaft portion for laterally engaging the bearing in said yoke and securing such bearing laterally against its associate shoulder on said sleeve, means comprising a nut in engagement with said shaft portion for laterally engaging the bearing in said motor housing and securing such bearing against its associate shoulder on said sleeve, whereby said sleeve is borne in substantially fixed axial position for rotation with said rotor, and a driving shaft portion integral with the shaft portion in said sleeve and extending outwardly from said collar and through said yoke and first mentioned bearing into engagement with said impeller.

4. An electric motor comprising a housing, a rotor in said housing, a rotary sleeve to which said rotor is secured, two bearings supported by said housing, one bearing engaging said sleeve on each of the opposite sides of said rotor, shoulders on said sleeve for securing each of said bearings laterally on one side, a shaft portion telescoped within and removably engaged to said sleeve for rotation therewith, a collar on said shaft portion for laterally engaging one of said bearings on opposite side to secure such bearing against its associate shoulder on said sleeve, packing means in said housing for cooperation with said bearing-securing collar, means comprising a nut in threaded engagement with said shaft portion for laterally engaging the other of said bearings on opposite side to secure such bearing against its associate shoulder on said sleeve, and a driving shaft portion integral with said shaft portion within said sleeve and extending outwardly from the collar on the shaft portion for engagement to a driven member.

References Cited in the file of this patent

UNITED STATES PATENTS

| | | |
|---|---|---|
| 2,210,401 | Fulton | Aug. 6, 1940 |
| 2,434,979 | Bergh | Jan. 27, 1948 |